(12) United States Patent
Chao (10) Patent No.: US 10,037,857 B2
(45) Date of Patent: Jul. 31, 2018

(54) LIGHT EMITTING KEYBOARD

(71) Applicant: DUCKYCHANNEL INTERNATIONAL CO., LTD., Taipei (TW)

(72) Inventor: Shih-Chuan Chao, Taipei (TW)

(73) Assignee: DUCKYCHANNEL INTERNATIONAL CO, LTD., Taipei (TW)

( * ) Notice: Subject to any disclaimer, the term of this patent is extended or adjusted under 35 U.S.C. 154(b) by 96 days.

(21) Appl. No.: 15/361,978

(22) Filed: Nov. 28, 2016

(65) Prior Publication Data

US 2017/0076884 A1    Mar. 16, 2017

Related U.S. Application Data

(63) Continuation-in-part of application No. 13/845,957, filed on Mar. 18, 2013.

(30) Foreign Application Priority Data

Sep. 19, 2012   (TW) .............................. 101218072 U (51) Int. Cl.
*H01H 13/83* (2006.01)
*G06F 3/02* (2006.01)

(52) U.S. Cl.
CPC ........... *H01H 13/83* (2013.01); *G06F 3/0202* (2013.01); *H01H 2219/039* (2013.01); *H01H 2219/048* (2013.01)

(58) Field of Classification Search
CPC .............. H01H 13/83; H01H 2219/039; F21V 23/0485; F21V 23/0471; F21V 23/0457
See application file for complete search history.

(56) References Cited

U.S. PATENT DOCUMENTS

| 5,264,845 | A | * | 11/1993 | Kwon | .................. | H03M 11/003 |
| | | | | | | 341/24 |
| 5,383,140 | A | | 1/1995 | Nanno et al. | | |
| 5,481,256 | A | | 1/1996 | Darbee | | |
| 7,180,022 | B1 | | 2/2007 | Chiu | | |
| 2003/0025840 | A1 | | 2/2003 | Arling | | |
| 2005/0062636 | A1 | | 3/2005 | Conway | | |
| 2013/0161170 | A1 | * | 6/2013 | Fan | ......................... | H01H 13/83 |
| | | | | | | 200/5 A |
| 2014/0092022 | A1 | * | 4/2014 | Chao | ...................... | H01H 13/83 |
| | | | | | | 345/170 |
| 2015/0334799 | A1 | * | 11/2015 | Ascorra | ............. | H05B 33/0863 |
| | | | | | | 315/76 |
| 2017/0076883 | A1 | * | 3/2017 | Chao | ...................... | H01H 13/83 |

* cited by examiner

*Primary Examiner* — Felix O Figueroa (74) *Attorney, Agent, or Firm* — Muncy, Geissler, Olds & Lowe, P.C.

(57) ABSTRACT

A light emitting keyboard is provided. The keyboard includes: a plurality of keys, wherein each of the keys has a light source; and a controller, for turning on the light source of at least one second key when a user presses one of the plurality of keys.

10 Claims, 7 Drawing Sheets

LIGHT EMITTING KEYBOARD

FIELD OF THE INVENTION

The present invention is a CIP of application Ser. No. 13/845,957, filed Mar. 18, 2013, the entire contents of which are hereby incorporated by reference.

BACKGROUND OF THE INVENTION

Description of the Prior Art

A keyboard, which is composed of a plurality of keys and used as an input device, has plain appearance and simple function. When a user uses the keyboard, he can only precisely determine whether a key is being pressed according to the mechanical sound of the key. This is boring and not entertaining. Therefore, the present invention provides a new keyboard which has better aesthetics and sense of operation, thus having added value characteristics.

SUMMARY OF THE INVENTION

The present invention provides a light emitting keyboard. The light emitting keyboard comprises: a plurality of keys, wherein each of the plurality of keys has a light source, an electric pad and at least one electric contact; a controller; a plurality of switches, electrically connected with the controller; a first circuit, electrically connected with the at least one electric contact of each of the keys and the controller; a second circuit, wherein each light source of the plurality of keys is electrically connected with the controller through respective one of the plurality of switches; wherein the controller is for turning on and off the light source of each of the plurality of keys, wherein for each key of the plurality of keys when pressed by a user, the controller turns on a group of other keys of the plurality of keys without turning on the light source of the key that is pressed, and none of the light source is turned on as none of the plurality of keys is pressed; wherein for each pressed key, the group of other keys comprises a first layer key group having keys surrounding and closely adjacent to the pressed key; wherein as the pressed key is pressed and the electric pad of the pressed key contacts the at least one electric contact of the pressed key, a first signal from the pressed key is transmitted to the controller through the first circuit, and the controller activates the switches which are electrically connected with the light sources of the group of other keys to turn on the light sources of the group of other keys.

Optionally, the group of other keys surrounds the pressed key or the group of other keys comprises each of the plurality of keys that is immediately adjacent to the pressed key.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
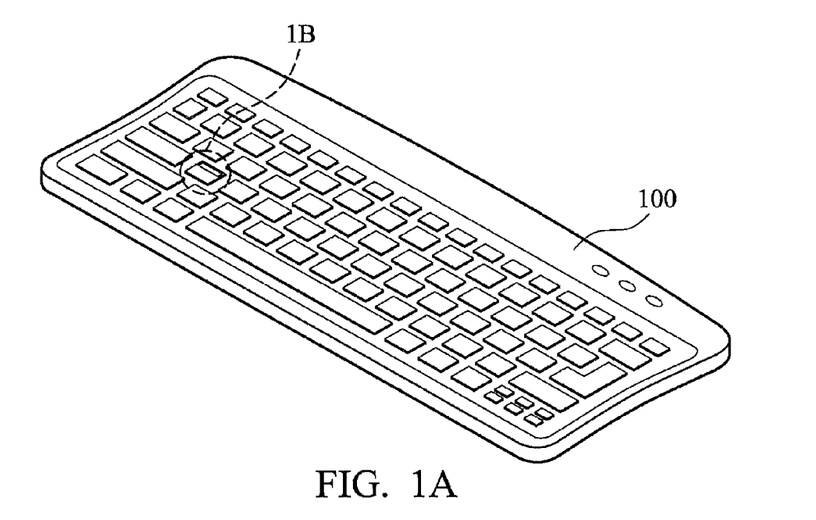
FIGS. 1A and 1B are schematic diagrams of a light emitting keyboard according to an embodiment of the present invention.
Figure 1B:
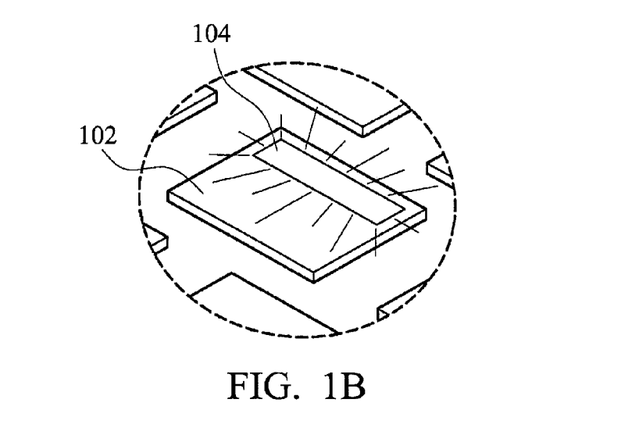

The present invention improves keyboards by adding better aesthetics and sense of operation. FIGS. 1A and 1B are schematic diagrams of a light emitting keyboard according an embodiment of the present invention. The light emitting keyboard 100 of the present invention has a plurality of keys 102, and each key 102 has a light source 104 which can be turned on and off. As shown in FIGS. 1A and 1B, in this embodiment, the light source of the key 104 is an inner LED built into the casing of the key 102. When the inner LED is turned on, the light is emitted through any light transmitting region on the proper position of the key 102. In other embodiments, the position, size and the shape of the light transmitting region are not limited to the embodiments in FIG. 1A and FIG. 1B, and those skilled in the art can appropriately design and modify the configuration of the light sources. Since the light emitting keyboard of the present invention is luminous, it is particularly suitable for dim environments.

Note that the light emitting keyboard 100 of the present has a unique controller 106 which is programmable and embedded in the keyboard 100. In this embodiment, the controller 106 is a firmware. For example, instructions and data are programmed into the controller 106 to response for controlling the operation of peripheral devices such as the light sources 104 and/or switches electrically connected with the light sources 104. When a user presses a first key of the keys, the controller 106 can turn on the light source of one or more than one second key, and when the user stop pressing the first key, the controller 106 can turns off the second key (hereinafter, the "first key" represents the key which is pressed, and the "second key" represents the key having a light source thereof turned on). The second key having a light source thereof turned on is not necessary to be the first key which is being pressed. Which keys are turned on depends on the modes of the controller 106.

As shown in FIGS. 2-7, specifically, the light emitting keyboard 100 further comprises a plurality of switches 108, a first circuit 110 and a second circuit 112. Each of the plurality of keys 102 further has an electric pad 114 and at least one electric contact 116 (two electric contacts in this embodiment). The plurality of switches 108 are electrically connected with the controller 106. The first circuit 110 is electrically connected with the at least one electric contact 116 of each of the keys 102 and the controller 106. Each light source 104 of the plurality of keys 102 is electrically connected with the controller 106 through respective one of the plurality of switches 108. In this embodiment, the first circuit 110 and the second circuit 112 are separated individual circuits with respect to the controller 106, and the first circuit 110 and the second circuit 112 are not electrically connected with each other.

The controller 106 is for turning on and off the light source 104 of each of the plurality of keys 102, wherein for each key of the plurality of keys 102 when pressed by a user, the controller 106 turns on a group of other keys 102*a* of the plurality of keys 102 without turning on the light source 104 of the key that is pressed. None of the light source 104 is turned on as none of the plurality of keys 102 is pressed, that is, all of the switches 108 are not activated and all of the light sources 104 are normally under "OFF" mode. For each pressed key, the group of other keys 102*a* comprises a first layer key group 102*b* having keys 102 surrounding and closely adjacent to the pressed key. As the pressed key is pressed and the electric pad 114 of the pressed key contacts the at least one electric contact 116 of the pressed key, a first signal from the pressed key is transmitted to the controller 106 through the first circuit 110, and the controller 106 activates the switches 108 which are electrically connected with the light sources 104 of the group of other keys 102*a* to turn on the light sources 104 of the group of other keys 102*a*.

The first circuit 110 includes a plurality of scanning circuits 110*a*, each scanning circuit 110*a* is electrically connected with the electric contacts 116 of parts of the keys 102 and the controller 106. The controller 106 scans all of the keys 102 to detect, via the scanning circuits 110*a* in order or at random, which electric contact 116 and electric pad 114 of which key are electrically connected with each other in a high frequency. The high frequency is defined as to sufficient to detect an electric connection of the electric contact 116 and electric pad 114 of the pressed key during a period of press on the pressed key. Through scanning on all the keys 102, the pressed key can be detected, and the first signal is generated and transmitted to the controller 106 through the first circuit 110 so as to activate parts of the switches 108 to turn on the light sources 104 of the group of other keys 102*a* according to one of various modes programmed into the controller 106. It is noted that there are just parts of the plurality of keys 102 and parts of the light sources 104 are presented in FIGS. 5 and 6 for illustrating relationships all of the plurality of keys 102 and all of the light sources 104.

It is noted that the group of other keys may surround the pressed key or that the group of other keys comprises each of the plurality of keys that is immediately adjacent to the pressed key.

Various modes of the light emitting keyboards of the present invention will be further described in the following embodiments in accordance with FIGS. 2-4.

Figure 2:
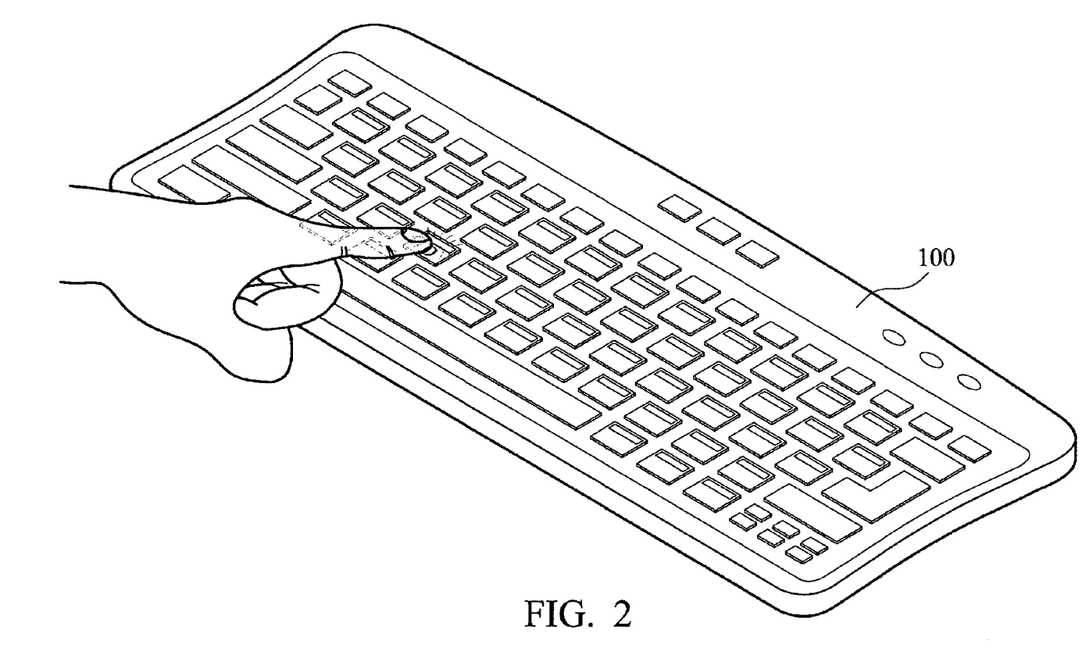
FIG. 2 shows the light emitting keyboard 100 of the present invention under a single key emitting mode.

Single Key Emitting Mode:

FIG. 2 shows the light emitting keyboard 100 of the present invention under a single key emitting mode. Please refer to FIG. 2 and FIGS. 5 and 6, the pressed key is the key having the light source thereof turned on. For example, the key D is pressed by the user and the switch 108 electrically connected with the light source 104 of the key D is activated so that the light source 104 of the key D is turned on and emits light, but the other keys that are not pressed by the user are not turned on. In this manner, the keys on the keyboard can flicker according to the pressing of the user's finger. Thus, a new operating experience is created, which also helps to enhance the sense of operation. Note that in some embodiments, when the user releases the pressed key, the turning off of the light source of the pressed key is delayed and the user can control and set the length of the delay time. In addition, in some embodiments, the luminance of the light source can also be designed to be controllable by the controller 106 to be gradually weakened before being turned off.

Figure 3:
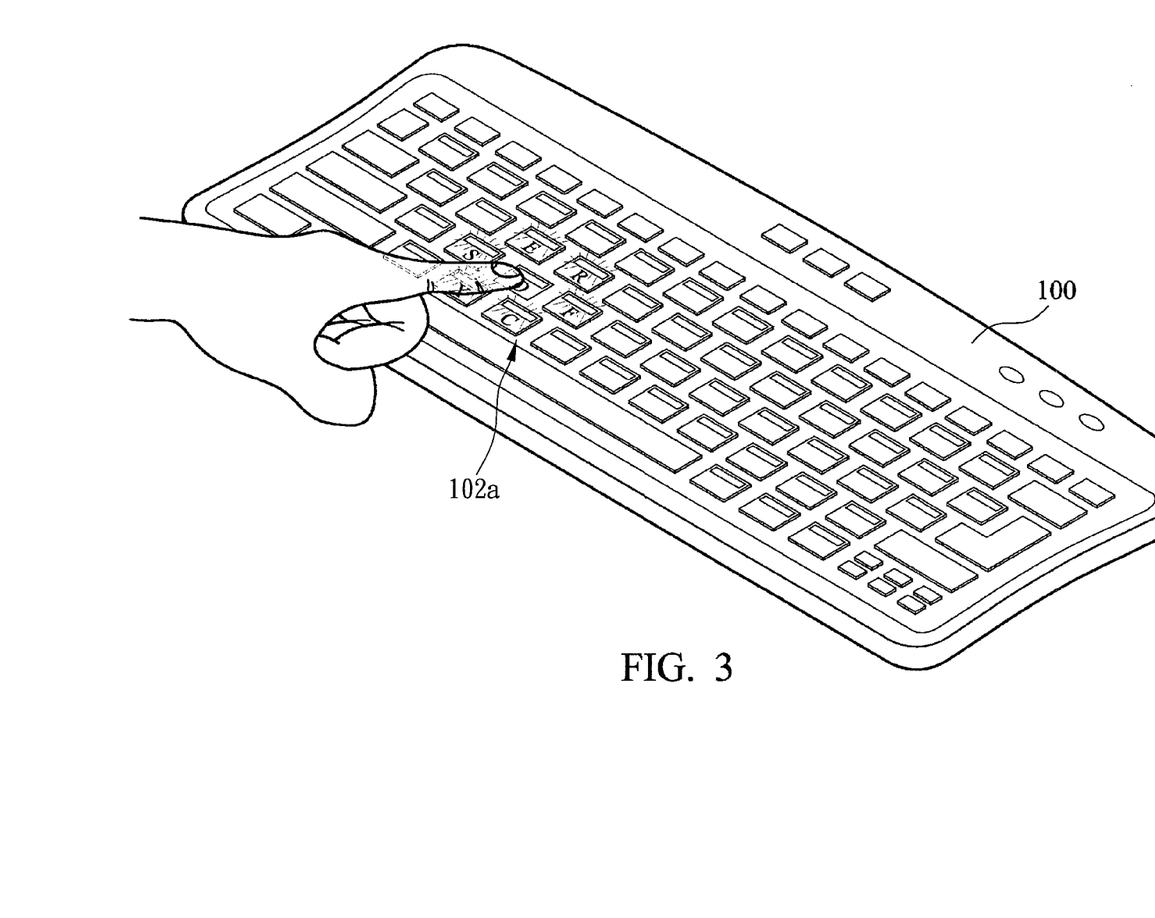
FIG. 3 is the light emitting keyboard 100 of the present invention under the surrounding keys emitting mode.

Surrounding Keys Emitting Mode:

FIG. 3 is the light emitting keyboard 100 of the present invention under the surrounding keys emitting mode. Please refer to FIG. 3 and FIGS. 5 and 7, under this mode, the group of other keys 102*a* include keys E, R, S, F, X and C that surround the key D. The key D is the pressed key. When the key D is pressed, the switch 108 electrically connected with the light source 104 of the key D is not activated and the light source 104 of the key D is not turned on, and the switches 108 electrically connected with the light sources 104 of the keys E, R, S, F, X and C are activated and the light sources 104 of the keys E, R, S, F, X and C are turned on. The keys 102 with light sources 104 of the keys E, R, S, F, X and C turned on are those keys surrounding the the pressed key (key D). In other words, when the user presses the key D (the pressed key), the light source of the key D is not turned on, but the light sources of the keys E, R, S, F, X, and C that surround the key D are turned on. Thus, a new operating experience which is different from that of the single key emitting mode described above is created. This embodiment is merely for illustration, and in other embodiments, the surrounding keys of the key D may include keys other than the key E, R, S, F, X, and C. In some embodiments, the surrounding keys can be turned on at different times with various styles, which will be further described in the following embodiments.

Breathing Light Mode:

The breathing light mode (not shown in Figs.) can be performed with the single key emitting mode or the surrounding keys emitting mode together. In this mode, the keys whose light source is turned on can vary the brightness of the light sources with a specific frequency. Specifically, the light emitting keyboard 100 further includes a frequency conversion circuit 118 electrically connected with the light sources 104 of the plurality of keys 102 and the controller 106, wherein the frequency conversion circuit 118 transfers frequency of a power source from the controller 106 into a specific frequency and transmits the power source to the light sources 104 of the group of other keys 102*a* so that the light sources 104 of the group of other keys 102*a* changes brightness with the specific frequency when turned on. In other words, the brightness of the second keys gradually repeatedly increases and then gradually weakens. When the specific frequency is mimics the human respiratory rate, the stable lighting variation will give users a breathing-like feel, thus adding a new entertaining operating experience to users.

Figure 4:
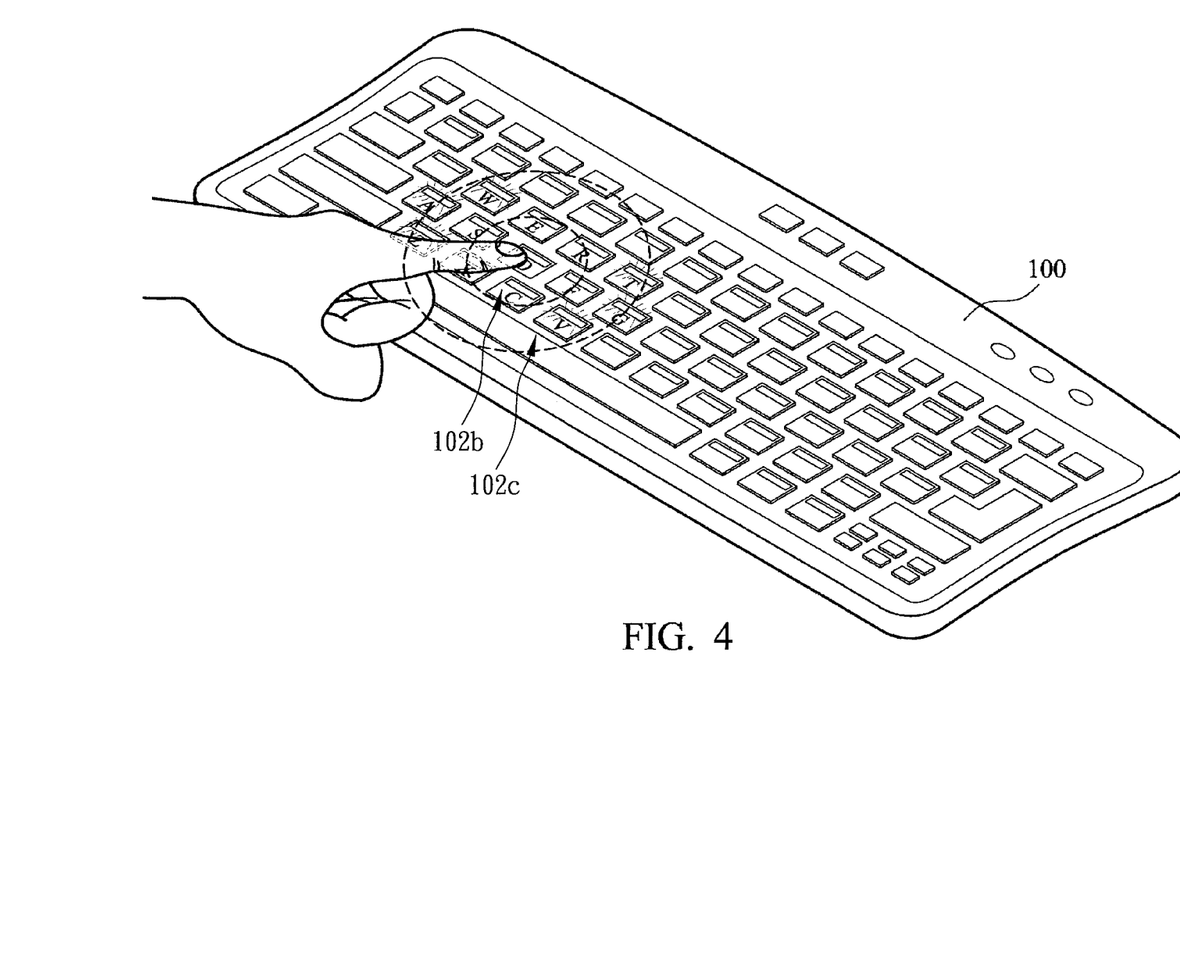
FIG. 4 is the light emitting keyboard 100 of the present invention under the ripple style emitting mode.
Figure 5:
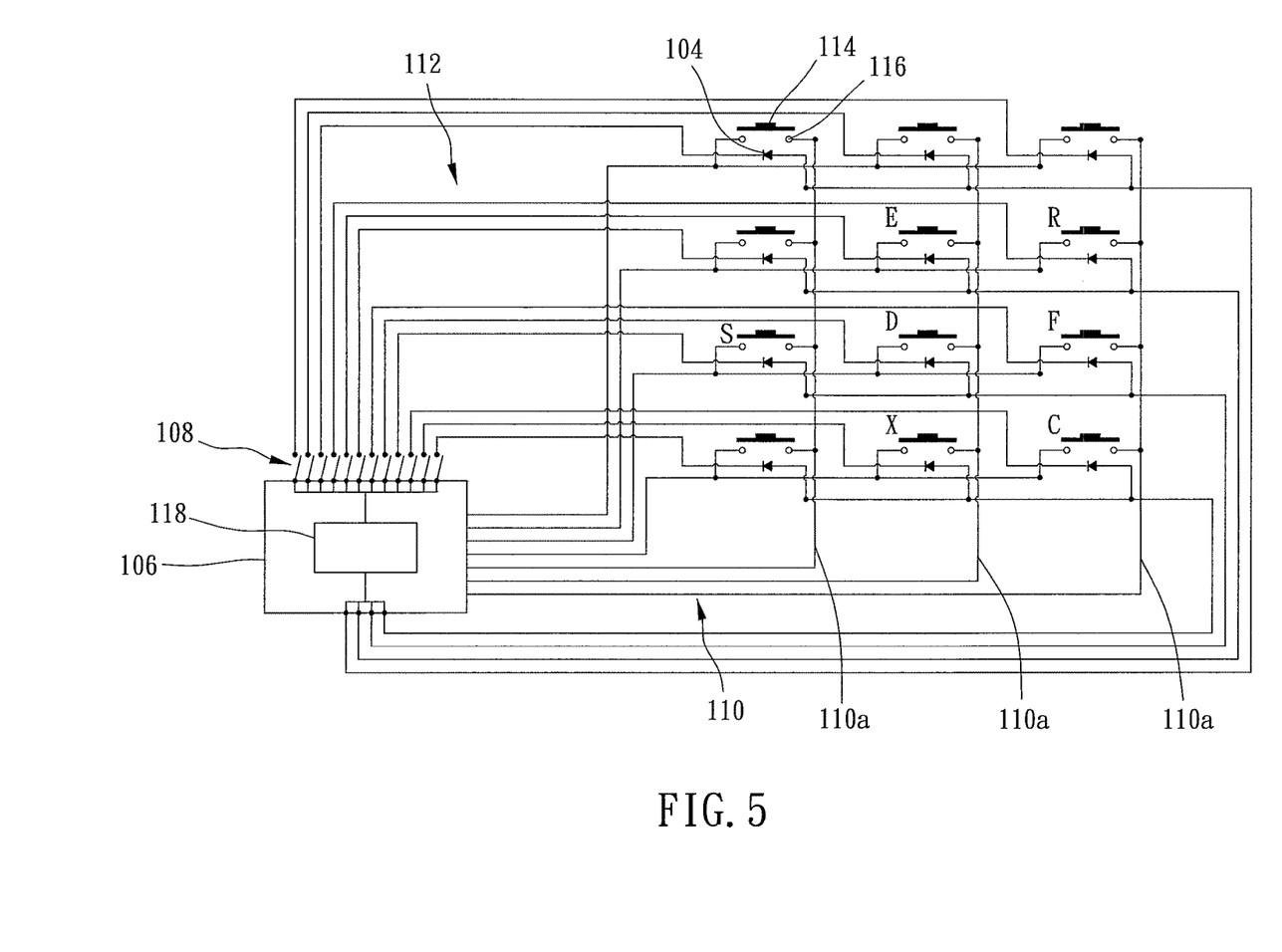
FIGS. 5-7 are partial circuit diagrams of a light emitting keyboard according to an embodiment of the present invention.
Figure 6:
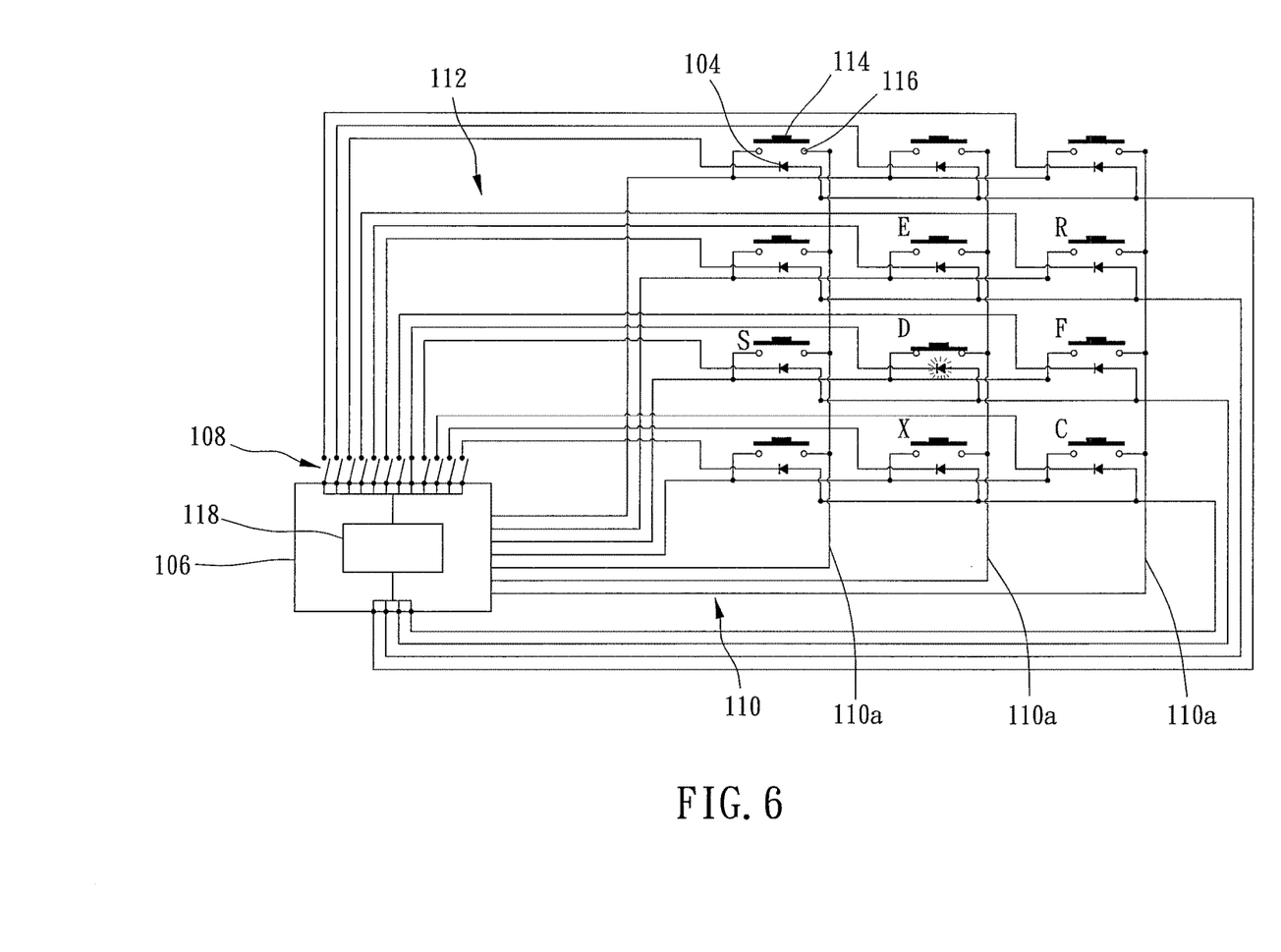
Figure 7:
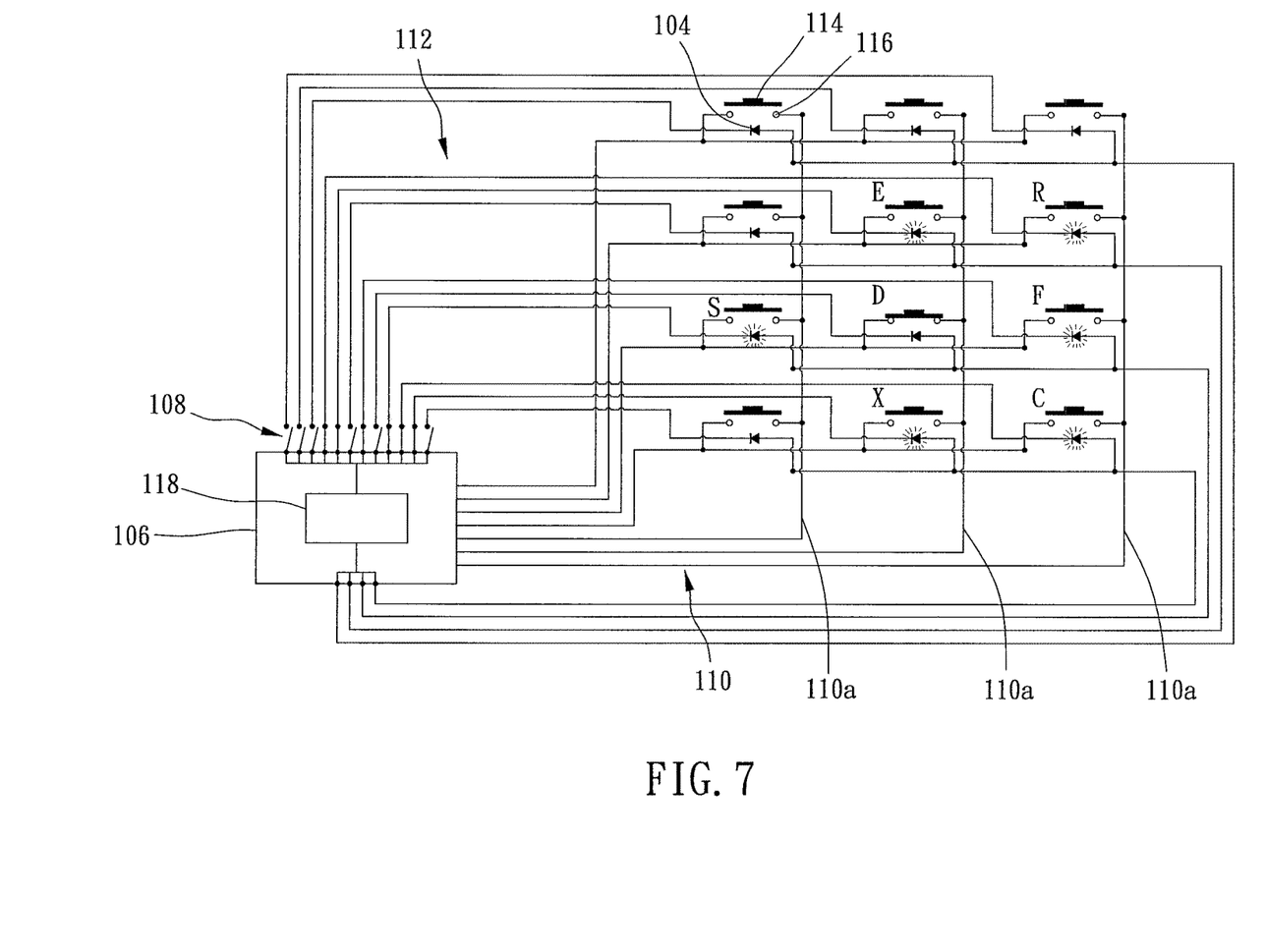

Ripple Style Emitting Mode:

FIG. 4 is the light emitting keyboard 100 of the present invention under the ripple style emitting mode. The ripple style emitting mode is a variant of the surrounding keys emitting mode. Please refer to FIG. 4 and FIGS. 5 and 7, in this mode, the keys 102 having light sources 104 which are turned on include various layers of key groups. For example, the key D is the pressed key, the first layer key group 102*b* of the keys can include the keys which are surrounding and closely adjacent to the key D, such as the keys E, R, S, F, X, and C, and, the second layer key group 102*c* can include the keys which are surrounding and closely adjacent to the first layer key group 102*b*, such as the keys T, G, V, Q, A, and Z, and so on. However, different from the surrounding keys emitting mode, each of the key grounds in the ripple style emitting mode are turned on and off at different time. In a better embodiments, the second layer key group 102*c* is turned on/off at a time slightly later than that of the time of that of the first layer key group 102b, the third layer key group is turned on/off at a time slightly later than that of the time that the second layer key group 102c is turned on/off, and so on (As shown in FIG. 4, when the light sources of the first layer key group 102b are turned off, the light sources of the second layer key group 102c are turned on). This emitting mode can create an effect similar to water wave ripples, thus improving the aesthetics of the light emitting keyboard.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A light emitting keyboard, comprising:
   a plurality of keys, wherein each of the plurality of keys has a light source, an electric pad and at least one electric contact;
   a controller;
   a plurality of switches, electrically connected with the controller;
   a first circuit, electrically connected with the at least one electric contact of each of the keys and the controller;
   a second circuit, wherein each light source of the plurality of keys is electrically connected with the controller through the second circuit and a respective one of the plurality of switches;
   wherein the controller is for turning on and off the light source of each of the plurality of keys, wherein for each key of the plurality of keys when pressed by a user, the controller turns on a group of other keys of the plurality of keys without turning on the light source of the key that is pressed, and none of the light source is turned on as none of the plurality of keys is pressed;
   wherein for each pressed key, the group of other keys comprises a first layer key group having keys surrounding and closely adjacent to the pressed key;
   wherein as the pressed key is pressed and the electric pad of the pressed key contacts the at least one electric contact of the pressed key, a first signal from the pressed key is transmitted to the controller through the first circuit, and the controller activates the switches which are electrically connected with the light sources of the group of other keys to turn on the light sources of the group of other keys.

2. The light emitting keyboard as claimed in claim 1, wherein the controller turns off the light sources of the group of other keys in real time or in a delayed time when the user stops pressing the pressed key.

3. The light emitting keyboard as claimed in claim 1, wherein for each pressed key, the group of other keys further comprises a second layer key group having keys surrounding and closely adjacent to the first layer key group.

4. The light emitting keyboard as claimed in claim 3, wherein the controller turns on the light sources of the first layer key group and the light sources of the second layer key group at different times when the user presses the pressed key.

5. The light emitting keyboard as claimed in claim 4, wherein the second layer key group is turned on after the first layer key group is turned on.

6. The light emitting keyboard as claimed in claim 1, further including a frequency conversion circuit electrically connected with the light sources of the plurality of keys and the controller, wherein the frequency conversion circuit transfers frequency of a power source from the controller into a specific frequency and transmits the power source to the light sources of the group of other keys so that the light sources of the group of other keys changes brightness with the specific frequency when turned on.

7. The light emitting keyboard as claimed in claim 1, wherein the keyboard is a mechanical keyboard.

8. The light emitting keyboard as claimed in claim 1, wherein the first circuit includes a plurality of scanning circuits, each scanning circuit is electrically connected with the electric contacts of parts of the keys and the controller, and the controller scans all of the keys to detect, via the scanning circuits in order or at random, which electric contact and electric pad of which key are electrically connected with each other in a high frequency.

9. A light emitting keyboard, comprising:
   a plurality of keys, wherein each of the plurality of keys has a light source, an electric pad and at least one electric contact;
   a controller;
   a plurality of switches, electrically connected with the controller;
   a first circuit, electrically connected with the at least one electric contact of each of the keys and the controller;
   a second circuit, wherein each light source of the plurality of keys is electrically connected with the controller through the second circuit and a respective one of the plurality of switches;
   wherein the controller is for turning on and off the light source of each of the plurality of keys, wherein for each key of the plurality of keys when pressed by a user, the controller turns on a group of other keys of the plurality of keys without turning on the light source of the key that is pressed, and none of the light source is turned on as none of the plurality of keys is pressed;
   wherein the group of other keys surround the pressed key;
   wherein as the pressed key is pressed and the electric pad of the pressed key contacts the at least one electric contact of the pressed key, a first signal from the pressed key is transmitted to the controller through the first circuit, and the controller activates the switches which are electrically connected with the light sources of the group of other keys to turn on the light sources of the group of other keys.

10. A light emitting keyboard, comprising:
   a plurality of keys, wherein each of the plurality of keys has a light source, an electric pad and at least one electric contact;
   a controller;
   a plurality of switches, electrically connected with the controller;
   a first circuit, electrically connected with the at least one electric contact of each of the keys and the controller;
   a second circuit, wherein each light source of the plurality of keys is electrically connected with the controller through the second circuit and a respective one of the plurality of switches;
   wherein the controller is for turning on and off the light source of each of the plurality of keys, wherein for each key of the plurality of keys when pressed by a user, the controller turns on a group of other keys of the plurality of keys without turning on the light source of the key that is pressed, and none of the light source is turned on as none of the plurality of keys is pressed;

wherein the group of other keys comprises each of the plurality of keys that is immediately adjacent to the pressed key;

wherein as the pressed key is pressed and the electric pad of the pressed key contacts the at least one electric contact of the pressed key, a first signal from the pressed key is transmitted to the controller through the first circuit, and the controller activates the switches which are electrically connected with the light sources of the group of other keys to turn on the light sources of the group of other keys.

* * * * *